United States Patent [19]
Chainini et al.

[11] Patent Number: 5,760,788
[45] Date of Patent: Jun. 2, 1998

[54] GRAPHICAL PROGRAMMING SYSTEM AND METHOD FOR ENABLING A PERSON TO LEARN TEXT-BASED PROGRAMMING

[75] Inventors: Devindra S. Chainini, Bellevue; Eric M. Yamada, Seattle, both of Wash.

[73] Assignee: Microsoft Corporation, Redmond, Wash.

[21] Appl. No.: 508,746

[22] Filed: Jul. 28, 1995

[51] Int. Cl.$^6$ .................................................. G06F 9/00
[52] U.S. Cl. ........................... 345/474; 345/348; 345/967
[58] Field of Search ........................... 395/348, 349, 395/351, 173, 174, 333, 334, 336, 339, 966, 967; 364/191, 192; 345/121

[56] References Cited

U.S. PATENT DOCUMENTS

| | | | |
|---|---|---|---|
| 5,375,125 | 12/1994 | Oshima et al. | 395/183.14 |
| 5,377,319 | 12/1994 | Kitahara et al. | 395/337 |
| 5,485,615 | 1/1996 | Wennmyr | 395/702 |
| 5,517,663 | 5/1996 | Kahn | 395/800 |
| 5,551,041 | 8/1996 | Beethe | 395/733 |
| 5,566,294 | 10/1996 | Kojima et al. | 395/348 |
| 5,566,295 | 10/1996 | Cypher et al. | 395/326 |

OTHER PUBLICATIONS

Clay et al., "Put:Lanaguage Based Interactive Manipulation of Objects", IEEE Computer Graphics and Applications, 1996, pp. 31–39.

Calloni et al., "Iconic Programming for Teaching the First Year Programming Sequence", Frontiers in Education Conference, 1995, pp. 2a5.10–2a5.13.

Steger, "Graphical Object–Oriented Multimedia Application Development: Technology and Market Trends", COMPCON'96 IEEE Computer Society International, 1996, pp. 299–304.

Bimbo et al., "Visual Programming of Virtual Worlds Animation", IEEE Multimedia, 96, pp. 40–47.

Primary Examiner—Heather R. Herndon
Assistant Examiner—Stephen Hong
Attorney, Agent, or Firm—Ronald M. Anderson

[57] ABSTRACT

A graphical programming application is provided that is intended to be run under a graphic user interface operating system. When running the graphical programming software application, a user can select a graphic object and an associated event, and define actions that occur when the event happens, to develop or modify the graphical program as desired. In addition to a graphic editor view mode, the user may optionally view a plain text listing corresponding to the graphic program, or use a Visual Basic for Applications (VBA) code editor in which statements corresponding to the graphic program are displayed, or activate a mode in which both code editors are visible at one time on the screen, so that changes made to the VBA statements are immediately reflected in the graphical program and vice versa. Since the user is able to view the VBA code that corresponds to the graphical program steps, proficiency in programming with VBA text-based code is more rapidly developed.

27 Claims, 12 Drawing Sheets

GRAPHICAL PROGRAMMING SYSTEM
AND METHOD FOR ENABLING A PERSON
TO LEARN TEXT-BASED PROGRAMMING

FIELD OF THE INVENTION

The present invention generally relates to a system for programming a computer, and more specifically, to a graphic programming system that enables a user to assemble and edit elements of a computer program on a display screen within a graphic user interface environment, by selecting options that are graphically presented to the user.

BACKGROUND OF THE INVENTION

Learning to write computer programs can be an intimidating task for an adult. The task is very much like learning a foreign language without the benefit of exposure to others who are speaking the language. In order to write a program, a person must at least be aware of the commands that are available in the programming language. Learning these commands is analogous to learning the vocabulary of a foreign language, and repeated exposure to the commands similarly provides the preferred approach for learning to write computer programs.

Further frustration for the novice programmer arises when a program fails due to syntax errors, such as the use of a comma in a program statement when a semicolon is required. Because it is likely that many logic, language, and syntax errors will appear in programs written by beginners, debugging even a relatively simple program can take hours, leaving the new programmer wondering if the task is worth the effort.

Imagine further the difficulty of teaching programming to youngsters eight to twelve years in age. Only the most intelligent and motivated of children in this age group are likely to be successful in learning to program computers. Most children who try to write a computer program using a conventional text-based programming language give up in frustration after making one or two attempts. In view of the difficulty involved in learning programming commands and concepts, correcting syntax errors, and debugging faulty logic, it is not surprising that most young children are unwilling to invest the time and effort required to learn to program in the conventional manner.

In recent years, software development applications designed to run under a graphic user environment such as Microsoft Corporation's WINDOWS™ operating system have become very popular because they reduce the effort required to create a computer program. Computer language programs such as Microsoft Corporation's VISUAL BASIC™ enable a user to quickly develop an interface for a program by selecting and positioning labels, drop-down list boxes, text boxes, and other objects and tools on the display screen. To create the interface, the user simply selects the desired object from a toolbar with a cursor that is controlled by a pointing device (e.g., a mouse), moves the object to the desired position on the display screen, and releases the pointing device select button. Properties and characteristics of the object, such as background color, border style, and size/type of font used are selected from among the options presented in drop-down list boxes within the menu of the VISUAL BASIC paradigm. However, to complete a programming project, the user must finally enter the textual statements that control how the objects within the interface respond to user input or to other events. This last step is frequently too intimidating for most children eight to twelve years in age to master, because the child must learn Basic language program commands and must use the correct syntax in writing the program code that supports the graphically created user interface.

Other graphic user programming applications have taken a further step in simplifying the task of creating working programs. For example, the OBJECT VISION™ programming application, which also runs under Microsoft WINDOWS, provides at least some of the underlying program code for objects that are graphically selected and arranged by the user on the display screen. However, the user does not see the underlying software code and cannot learn from decisions made by the programming application in producing it. In addition, the predefined tools and control actions that are provided in such program development applications are intended for adults, i.e., for use in business or in connection with adult hobbies and interests that are typically boring to young children. Even if adults or children use such program development applications, they typically do not progress in their programming skills, nor do they learn how to write more sophisticated and varied programs that are beyond the range of such applications.

A product that allows children to create games by selecting graphic objects is KLIK & PLAY™ software, which was developed by Europress Software and is distributed by Maxis. In the KLIK & PLAY programming environment, the child is provided with several games that can be modified by adding objects or by changing the properties and/or actions of the objects in the game. Once the child develops confidence in making changes to the provided games, the child is encouraged to create a game by combining provided graphic objects on one of the provided backgrounds. In a Storyboard Editor that displays thumbnail-sized representations of the levels (pages) of a game, the child selects a level to edit. An Edit Level Option can then be chosen from a menu to select, add, and/or edit objects in the level. The Edit Level screen lists a number of different libraries covering various subjects of interest to children, such as space ships, warriors, animals, and birds, etc. The objects in a selected library are displayed in a bar across the top of the display screen. By selecting an object from the bar with the cursor, the child can move it into the game window of the current game level. After an object has been placed in the game window, clicking on it with the right mouse button opens a Properties selection box in which the child can select Movement, Direction, View (relative position of object in regard to other objects), Edit Animation (opening an animation dialog edit box), Edit Icon and Object Name, set a New Level Object (Active, Backdrop, or Quick Backdrop), or Resize the object.

Once all object properties are set, the child selects the response(s) that will occur for each event occurring in the game level, e.g., producing a selected sound in response to the collision of two objects. When selected, a spreadsheet-like Event Editor shows each of the objects used in a level at the top of the screen. On the left side of the screen are listed the conditions for the object interactions. If the child selects an object, the other objects with which the selected object interacts are identified by check marks in a grid. For example, in a pinball game, the various objects include objects with which the pinball collides. If the pinball is selected, the list on the left shows collisions between the ball and each of the other objects. When the cursor is moved over the check mark below an object, a label shows the response to the collision between the ball and that object.

Only a limited number of predefined responses are available for each type of event in the KLIK & PLAY software. There is no option in the product to enter text program steps that might extend the range of game object interactions beyond those provided. Although it is possible to use the product to produce relatively sophisticated games without the opportunity to write any text-based program code, there is an inherent and predefined limit to the variety of actions and movements that can be achieved with the software. More importantly, the youngster is never given the opportunity to learn how the graphic objects, events, properties, and responses chosen in the purely graphic paradigm translate into corresponding program code. Thus, KLIK & PLAY, like other such purely graphic programming applications, does not lead a child along a natural progression from simple graphic object manipulation into familiarity with the underlying program code represented by the graphic objects, their responses, and interactions.

It will be apparent that a new approach is needed to teach young children to program computers. The programming system that achieves this goal should be graphic and simplistic in nature at its base level, to initially encourage programming, but should enable the young programmer to develop programming skills beyond simply selecting and assembling graphic symbols to create a program. In addition, the system should pique the interest of youngsters by including objects and tools of a type that children are likely to want to use and to which they will readily relate. Most children enjoy playing games and will immediately embrace the opportunity to modify games that are provided, even if simple in nature. Providing appropriate graphics, animation, and sound effects that can be added to the programs modified/developed by children should further encourage and motivate them to learn more about the underlying program language. Products such as KLIK & PLAY succeed in achieving this basic object of being interesting and in providing a relatively simple technique to create/modify games; however, there is no attempt made in this or other such prior art products to advance a child to a higher programming skill level.

To accomplish a further educational benefit, a programming application should enable users to compare the graphic program that they produce with the corresponding text-based program code. By exposing new young programmers to text-based program commands, vocabulary, and syntax in this manner, many will be led to learn more about conventional programming. Currently, a computer programming application of this type is not available.

SUMMARY OF THE INVENTION

In accordance with the present invention, a graphical programming system is defined that is adapted to execute under a graphic user interface. The graphical programming system enables a user to design and modify a graphical program, and in the process, assists the user in learning to program a computer using a text-based programming language. The graphical programming system executes under the graphic user interface on a computer that includes a user input device for making selections and entering instructions that control the graphical programming system, and a display screen on which are displayed components of the graphical programming system. Object means are provided for presenting a plurality of graphic objects on the display screen of the computer and for enabling the user to select a specific graphic object from among the plurality of graphic objects, for inclusion in the graphical program. Action means display a plurality of actions to the user on the display screen, and enable the user to select a specific action for execution by a user selected graphic object, in a user defined sequence of graphic program steps that include text and graphic objects. The user defined sequence of graphic program steps comprise the graphical program. Moreover, mode selection means are included for enabling the user to select a mode from among a plurality of different modes. One of the plurality of different modes displays at least a portion of a textual computer program listing corresponding to a portion of the graphical program. The textual computer program listing assists the user to learn computer programming by exposing the user to program commands of the text-based programming language that correspond to the graphic program steps of the graphical program.

The plurality of modes selectable by the user include a plain text mode enabling the user to enter text that is translated to corresponding commands in the text-based programming language for modifying the graphical program. The plain text entered by the user is constrained to text that correctly translates to the commands in the text-based programming language. Preferably, the plain text that can be entered by the user is limited to a predefined set of programming language constructs that are presented to the user as keys on a graphical keyboard displayed on the display screen, for selection and use in designing and modifying the graphical program.

Another mode selectable from the plurality of modes enables the user to freely enter and modify commands of the text-based programming language in order to further design and modify the graphical program. Yet another mode of the plurality of modes enables the user to simultaneously view both an editor for the graphical program and an editor for the text-based programming language. As a result, changes in the graphical program are immediately reflected in the corresponding commands of the text-based programming language, and changes in the commands of the text-based programming language are immediately reflected in the corresponding graphical program.

Preferably, the graphical programming system includes a basic graphical program for the user to modify.

Means are included in the graphical programming system for mapping between the graphical steps of the graphical program and the corresponding commands of the text-based programming language. The graphical program is executed by the computer, based upon underlying corresponding commands of the text-based programming language.

The graphical programming system further comprises animated help means that prompt the user to carry out steps required in designing and modifying the graphical program. The help means also provide aid to the user in debugging the graphical program. Further included are event means that enable the user to select an event from among a plurality of events graphically presented to the user on the display screen, for association with one of the graphic objects selected by the user. The action means enable the user to specify the action associated with one of the graphic objects selected by the user that will be implemented when the event selected occurs.

Another aspect of the present invention is directed to a method for creating a graphical program for use on a computer, running under a graphic user interface. The method enables a user to graphically design and modify the graphical program, and by doing so, to better understand a text-based programming language. Generally, the steps of the method are consistent with the functions of the graphical programming system described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
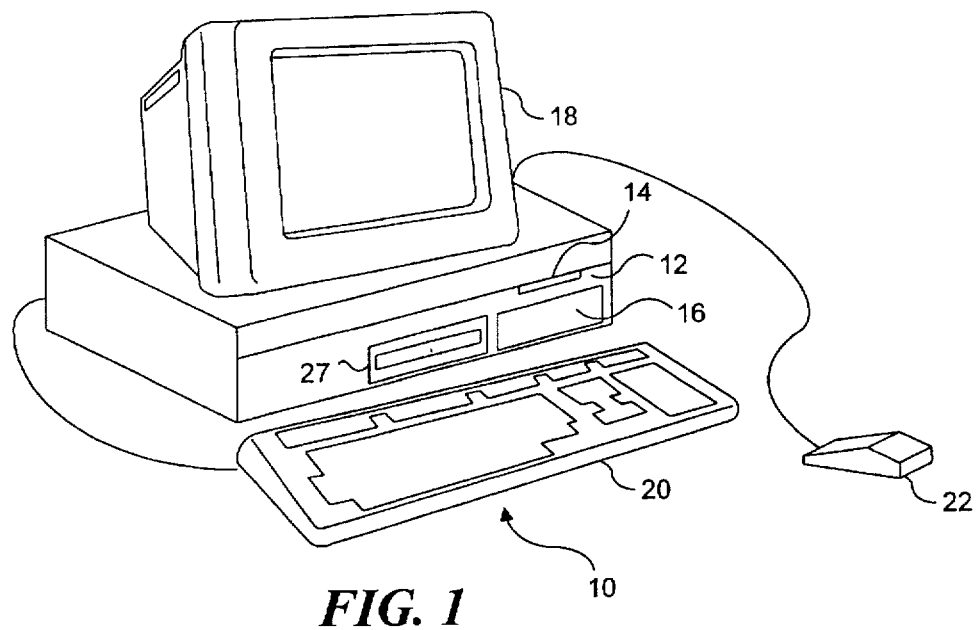
FIG. 1 is a block diagram of a personal computer system suitable for use in implementing the present invention.

The present invention is implemented by a set of software instructions that are executed on a personal computer system 10, like that shown in FIG. 1. Personal computer system 10 is generally conventional in design, and in the drawing is shown as a desktop system having a processor chassis 12 that includes a floppy disk drive 14 and a hard drive 16. Also included within the processor chassis, although not required, is a CD-ROM drive 27. Atop processor chassis 12 is a display monitor 18, and coupled to the processor chassis for input of instructions and control of application programs running on the personal computer is a keyboard 20. A mouse 22 (or other conventional pointing device) is also connected to processor chassis 12, thereby enabling the user to control the position of a cursor (not shown) on the screen of display monitor 18, and enabling the user to make selections from text and graphic objects on the screen by positioning the cursor over the object and selecting the desired option with the select button on the mouse or other pointing device (text and graphic objects are also selectable with the keyboard). A specific graphic object displayed on the screen can thus be chosen from among a plurality of such objects. In addition, it is also possible to "drag and drop" graphic objects from one point on the screen to another. This option is particularly relevant to the preferred embodiment of the present invention, since it enables a user to manipulate graphic objects in designing and modifying a graphic program.

Figure 2:
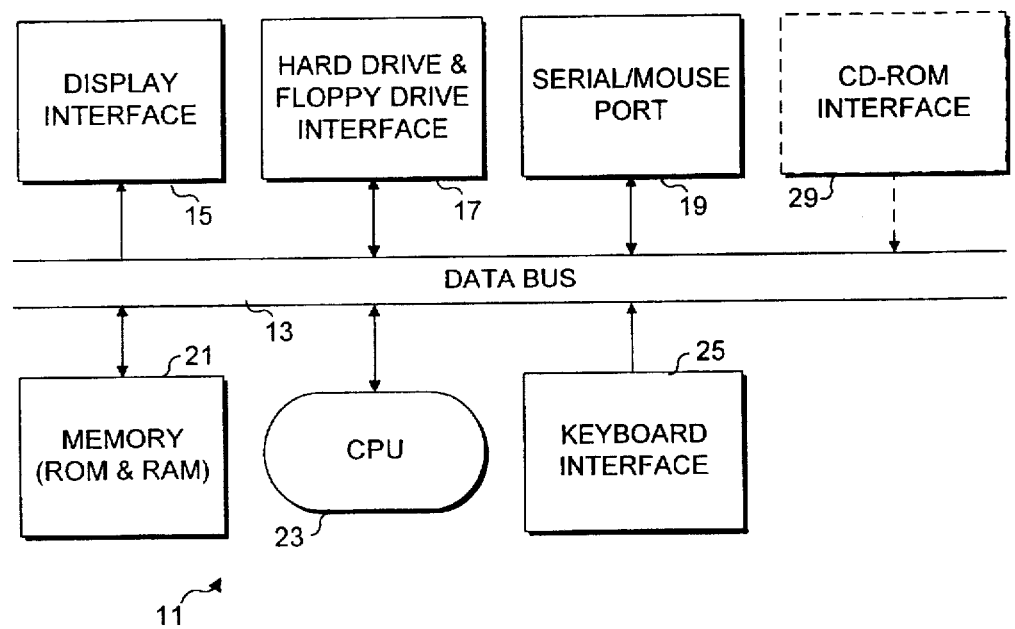
FIG. 2 is a block diagram showing components of the personal computer system of FIG. 1.

Within processor chassis 12 are disposed a plurality of integrated circuits and other components, as are well known to those of ordinary skill in the art. FIG. 2 is a block diagram illustrating components within the processor chassis that are used for implementing the present invention on personal computer 10. For example, a display interface 15 is provided to couple graphic output from the graphic programming system executing on a CPU 23 to display monitor 18. Communication between CPU 23 and display interface 15 passes over a data bus 13, as do instructions and control signals for other elements of the personal computer system. A hard drive and floppy drive interface 17 provides bi-directional communication between floppy drive 14 and hard drive 16, conveying data bi-directionally between the storage provided on a floppy drive disk or on the magnetic media of hard drive 16 (not separately shown) and CPU 23, over data bus 13. The data bus also conveys signals between the CPU and a serial/mouse port 19, to which mouse 22 is connected. Alternatively, mouse 22 can be connected to personal computer 10 through a bus port (not shown), allowing the serial port to be used for other purposes.

A memory 21 includes both read only memory (ROM) and random access memory (RAM) for storing variables and machine instructions that control the operation of CPU 23. Memory 21 is connected to CPU 23 through data bus 13, as well as to the hard drive or floppy drive through interface 17. Typically, when the user executes a program on the personal computer, program steps comprising machine instructions are loaded into memory 21 from a CD-ROM, from the hard drive, or from a floppy disk that is inserted into the floppy disk drive. The program steps are then executed by CPU 23 to carry out the functions of the computer program being run. In most software running on a computer, including the graphic programming system comprising the present invention, the user interacts with the program being executed by the CPU by making selections and entering text that cause the CPU to implement specific functions defined by the machine instructions, in a manner determined by the user's input. A keyboard interface 25 couples keyboard 20 to the data bus, thereby providing a path for signals developed by operator input on keyboard 20 to be conveyed to CPU 23.

Although a desktop type personal computer is illustrated in FIG. 1, the present invention can also be implemented on a laptop/portable computer, or on a workstation. In fact, virtually appropriate machine instructions can be developed to implement the present invention on almost any computer that is capable of displaying graphics.

It is contemplated that the present invention will be sold as an application program specifically intended to entertain and to educate children in the ages of eight through twelve. However, the concepts embodied in the preferred embodiment can readily be extended to provide the same benefit to users of other ages and capabilities. Accordingly, it is not intended that the present invention in any way be limited in scope by the disclosure of this somewhat more simplistic preferred embodiment, which is more suitable for younger children with less ability to learn conventional programming. The application program will typically be provided to the user either on a CD-ROM or on a floppy disk. Accordingly, a CD-ROM interface 29 is optionally included among the components within processor chassis 12 and is coupled to data bus 13 for conveying the contents of files stored on a CD-ROM onto data bus 13 for transfer to RAM within memory 21. If the application program comprising the present invention is provided on a floppy disk, the disk will be inserted within floppy drive 14, and the files comprising the program either transferred to hard drive 16 or used to run the program directly. In either case, the machine instructions in the files comprising the program will be transferred into RAM, for use in controlling CPU 23 to carry out steps under the direction of the user to enable the user to create, run, and/or modify graphic programs.

Since the preferred embodiment of this invention is intended to be used by relatively young children, it is likely that a set of predefined graphic programs comprising games will be provided with the application program to insure that the users are sufficiently entertained to enable the educational process to proceed. Moreover, testing has shown that providing a basic graphic game program, which is readily modifiable by a child, will more likely hold the child's interest and thereby succeed in educating the child, helping him/her to learn the basic concepts for creating an original program "from scratch." The intent is to enable the child to initially develop confidence in modifying one of the basic graphic game programs provided to the child with the application program, by manipulating graphic objects on the screen of the display monitor. However, more importantly, the child will also be encouraged to modify the provided basic programs in one of three additional editing modes that are textually oriented. Two of these modes disclose an underlying text-based programming language actually used to implement the graphical program. In the preferred embodiment, Microsoft Corporation's VISUAL BASIC FOR APPLICATIONS™ (VBA) product is used as the text-based programming language. It will be understood that other text based programming languages could be used in the present invention, particularly other forms of Basic.

The child need not know or understand the VBA command structure when simply modifying the graphical program, since the syntax and other problems associated with programming in a pure text-based program language will likely be beyond the initial skill level of users in the intended age group. However, as the child develops more experience with the graphical programming mode, it is likely that the child will move into making modifications of an existing graphical program by changing or adding VBA program steps instead of simply changing graphic objects and actions in a game.

Figure 3:
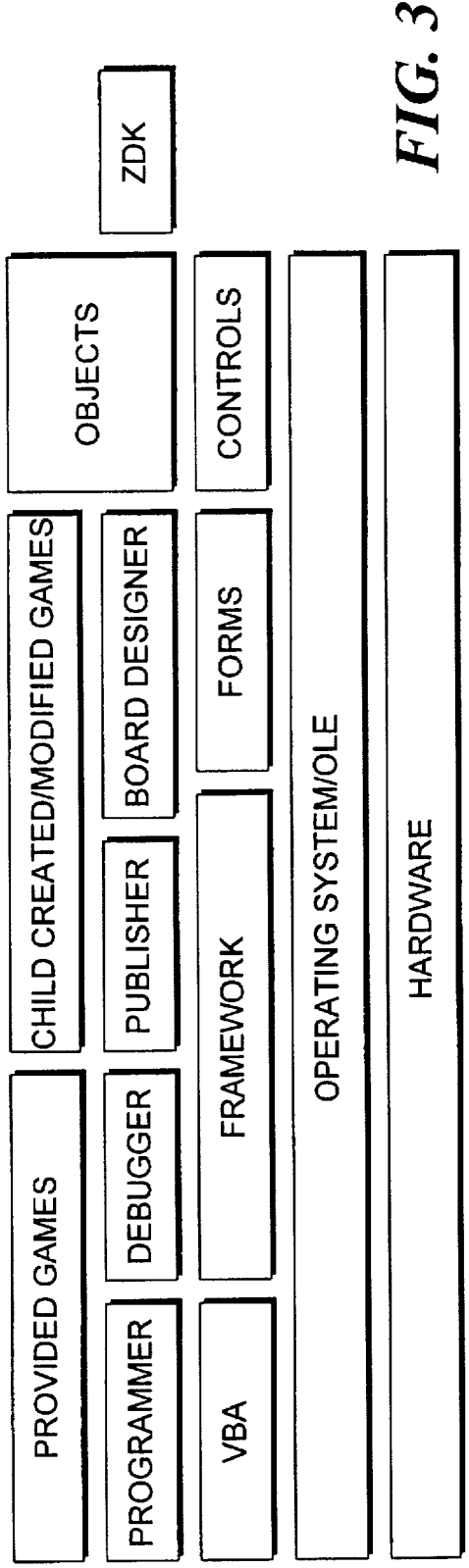
FIG. 3 is a block diagram showing functional components of the graphical programming system.

Referring to the block diagram shown in FIG. 3, the functional components of an editing environment that are provided to enable a child to create, run, and/or modify a game are shown in an approximate hierarchy. The top of the block diagram is fully exposed to the child, and each of the underlying blocks are increasingly less evident.

As noted above, the application software comprising the current preferred embodiment of the present invention will include a number of prepared basic graphical games. It likely that a child will initially simply play the games; however, users will be encouraged to modify the games using the graphical programming mode, and later will begin to create games, first in the graphical programming mode,
and later, in a text-based mode. It should be noted that these predefined games can be substantially changed as a result of modifications contributed by a child using the editing capabilities provided in the graphical programming system, both in the graphic programming/editing mode, and in the text editing modes that will be discussed below. The child is also provided with a set of predefined objects for use in the graphical programmed games. Functional components supporting the editing include a programming module that enables the child to create/modify game programs graphically and later, as confidence and ability are gained, with text-based program steps. A debugging module is also included, as is a publishing module, which is used to create a run-time version of any game created or modified by a child. Thus, with the publishing module, a child can modify or create a game and save it to a floppy disk in a run-time form so that the game can be run on a computer on which the graphical programming system software is not installed.

A board designer is used to create a graphic backdrop for the games, enabling the child to select among a variety of predefined backdrops as appropriate for the specific game being edited or created. As shown in the right-hand side of FIG. 3, a Zack development kit (ZDK) is included, for use by application developers to create objects.

The graphical game programs are actually implemented using an underlying VBA programming language engine or system, which is entirely text-based. Support for the graphical programming system is provided by a framework or set of code libraries and control structures. To simplify the programming process, forms, which are basically graphic containers or windows for the elements included in the editing screen presented to a user, are included, along with controls for manipulating objects and other aspects of the graphic and text-based programming environments available to a child, by selecting among the modes.

As is the case with any application running on personal computer 10, the graphic programming application interacts with the operating system. In the preferred embodiment, Microsoft's WINDOWS™ graphic user interface operating system is used to effect the graphic programming environment presented to the user. This operating system includes Object Linking and Embedding (OLE) capabilities. It is also contemplated that the present invention could be implemented for execution under other graphic user interface operating systems, such as Apple Computer Corporation's SYSTEM 7™. Underlying the operating system is the hardware upon which the graphic programming application software and operating system run. This hardware, which was described above in connection with the preferred embodiment, is preferably based on Intel Corporation's 80386 CPU (or better), but may comprise other types of personal computing systems that use other types of processors, such as those sold by Apple Corporation.

Figure 4:
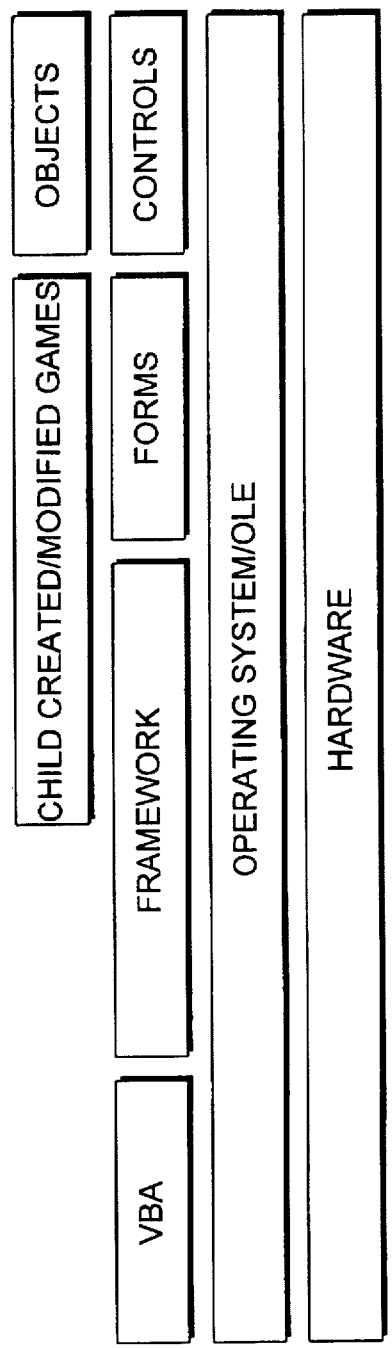
FIG. 4 is block diagram showing functional run-time components of graphical programs (games) that are designed/modified by the graphical programming system, as disseminated to other users.

In FIG. 4, a block diagram illustrates the functional components of the present invention when it is running a program created or modified by a user. As indicated by the layout of the functional blocks, it will be apparent that the games created or modified by a child are on the top level, clearly evident to the user. In addition, objects included or provided for inclusion within a child-created or modified game are also made available to the user during the running of the graphic program. However, it should also be noted that although it is disposed on the second layer, the VBA is available to the user for editing a game that is running. Similarly, the framework, which includes the set of code libraries and control structures, is at least partially evident to a user as the game created or modified by the user is running.

In contrast, the forms and controls are not made evident to a user, although they are certainly implemented in the background. The only exception would be controls that are included or available for use in a game that is running, to enable user interaction. In addition, the operating system/OLE and hardware are necessary elements for running the user-created or modified game.

Figure 5:
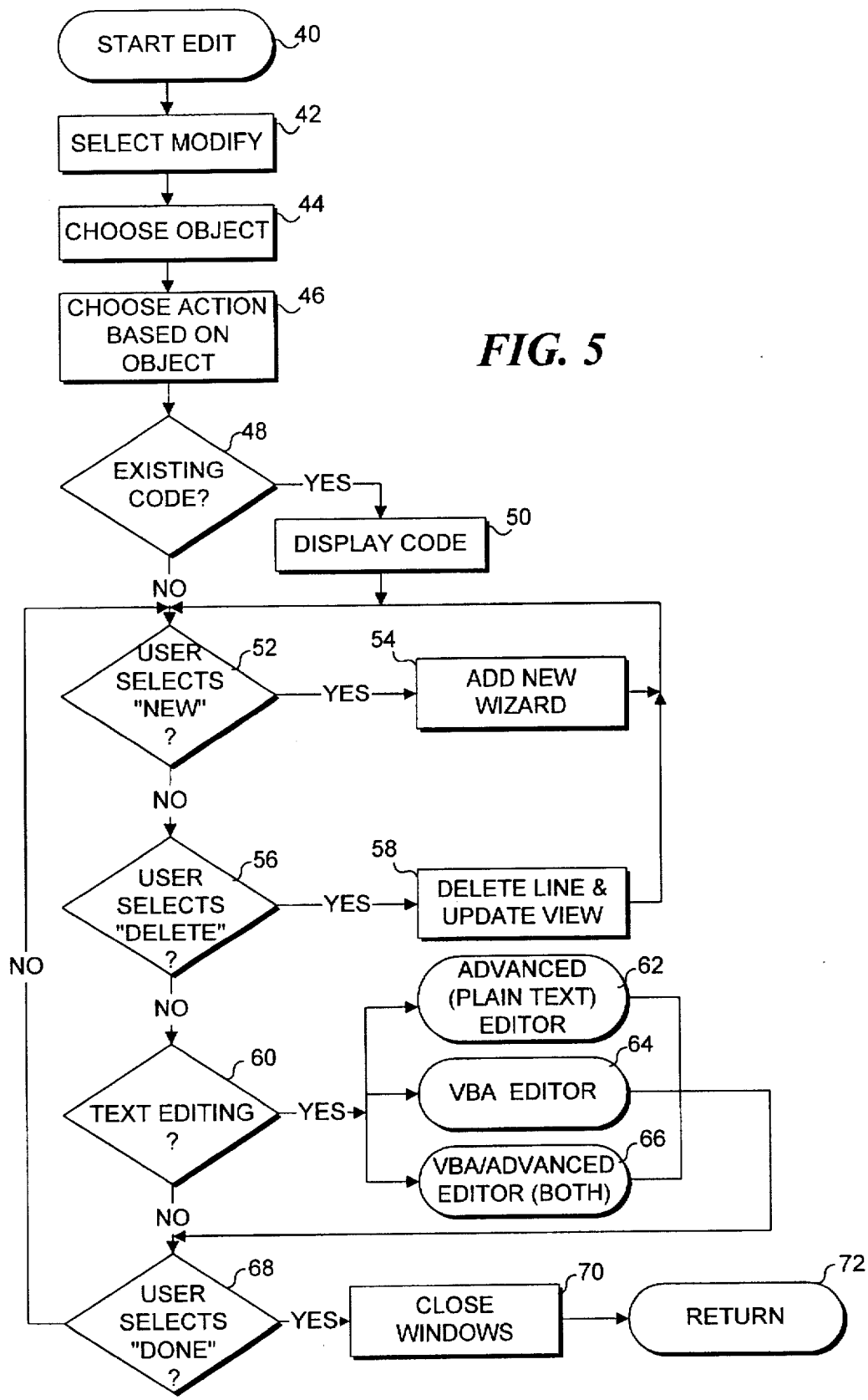
FIG. 5 is a flow chart showing the logical steps implemented in two modes in which the graphical programming system operates.

With reference to FIG. 5, a flow chart illustrates an overview of the logical steps involved in editing/creating a program with the present invention. The ability to edit or create a program using graphical objects is an important aspect of the present invention, since it enables relatively unskilled programmers such as children to quickly make changes and develop programs, and enables them to grasp simple programming concepts. As will be noted below, a user also has the option and is encouraged to increase his/her understanding of text-based programming as it relates to the graphic program developed using graphic objects, by selectively editing the program in other views or modes that expose the underlying text-based programming steps.

A user starts the editing process in a block 40. The first step is to respond to a user's decision to modify an event, as indicated in a block 42. An event can be any action carried out within a game (or other type of program), e.g., the occurrence of one object striking another. Next, a block 44 enables the user to choose an object, which in connection with an action, will determine an event. A block 46 specifically provides that an action is chosen; this choice depends upon the object that is selected by the user, to avoid nonsensical results. For example, if the user chooses a tree as an object, the optional actions that are presented for modification, addition, or deletion would not include such actions as "screaming," because trees are incapable of that action.

If the graphic choices implemented by the user make use of existing code in the graphical program, a decision block 48 responds by proceeding to a block 50 that displays the code. Thus, the user is enabled to see the corresponding text-based code associated with the combined event and object selected for modification, assuming that code had already been provided for that combination. Thereafter, or if code does not already exist for the event and object interaction selected by the user, the logic proceeds to a decision block 52. In decision block 52, the program determines if the user has chosen to add a new action rather than modifying an existing action If adding a new action, a Wizard or Help screen is opened to assist the user, as indicated in a block 54. Wizards, which are also used in other Microsoft Corporation products such as WORD FOR WINDOWS™, are routines that lead a user through a series of steps to accomplish a desired task. Thereafter, the logic loops back to decision block 52, and if the user has not selected New, proceeds to a decision block 56. In decision block 56, the program determines if the user has indicated that an object or action should be deleted. If so, a block 58 provides for deleting the line(s) of code corresponding to the object or action and updating the view to correspond to the status of the graphical program following deletion of the object or action. After block 58, decision block 52 again determines if the user is selecting a new object or event. However, if the response to the determination in decision block 56 is negative, the program proceeds to a decision block 60, which determines if the user has selected "Text View."

There are actually three modes associated with Text View, each of which can enable the user to edit the program by entering actual textual program statements (as opposed to simply selecting graphic objects/actions to make changes in the program). These alternative options include the advanced view editing mode, referenced in a block 62, a VBA view editing mode, referenced in a block 64, and a mode in which both the VBA and graphical editing modes are viewed simultaneously on the screen, which is referenced in a block 66. Details concerning each of the editing modes are described below.

Assuming that the user has not selected to edit the program in the Text View, a decision block 68 determines if the user has selected "Done," and if so, a block 70 provides for closing the windows open for editing the program. In a block 72, the logic returns to the run mode of the graphic program. In block 68, if the user does not select Done, the logic returns to decision block 52, giving the user the option of selecting a new object or action to be added to the game program being edited.

Figure 6A:
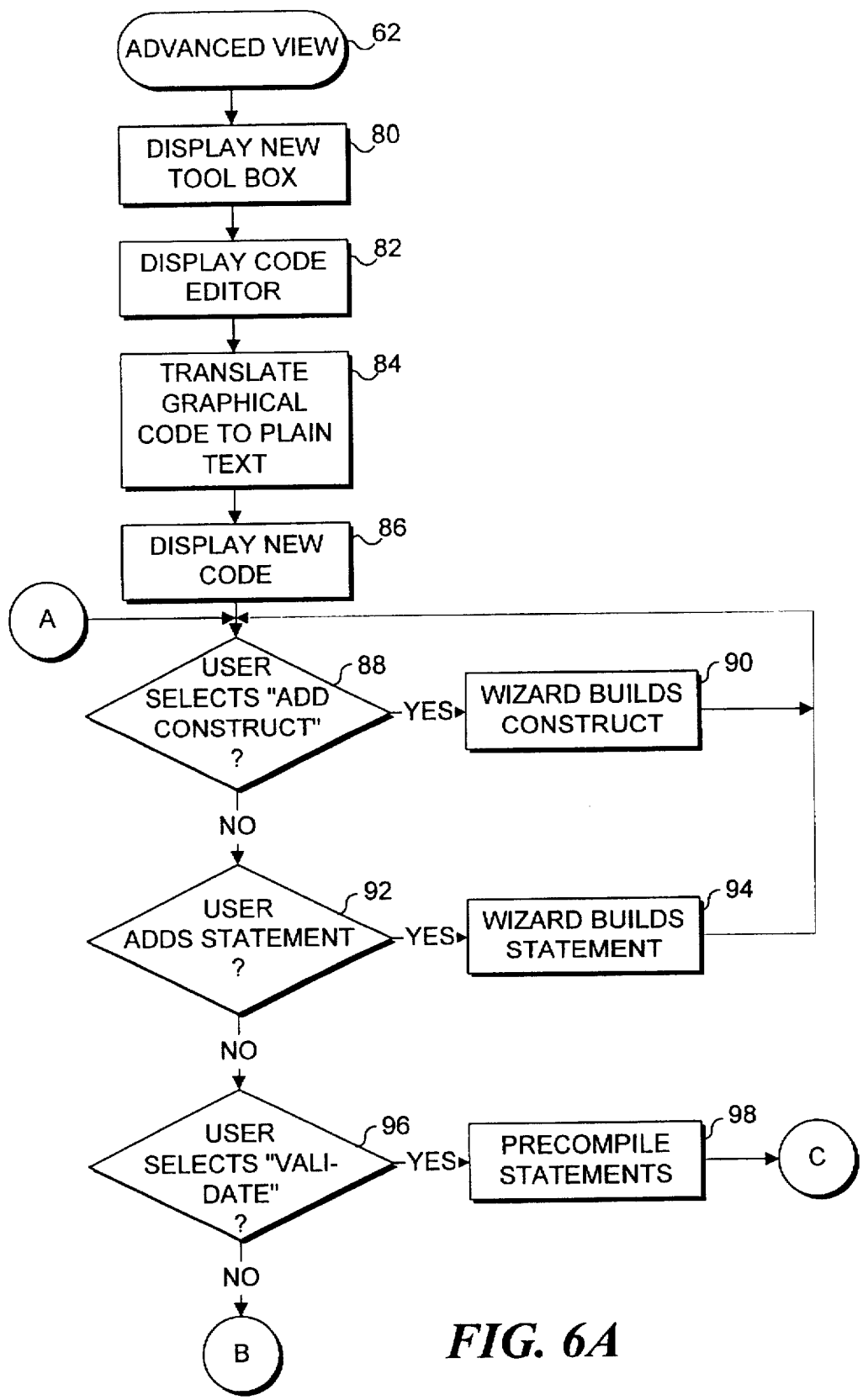
FIGS. 6A and 6B are a flow chart showing a third mode of the graphical programming system.
Figure 6B:
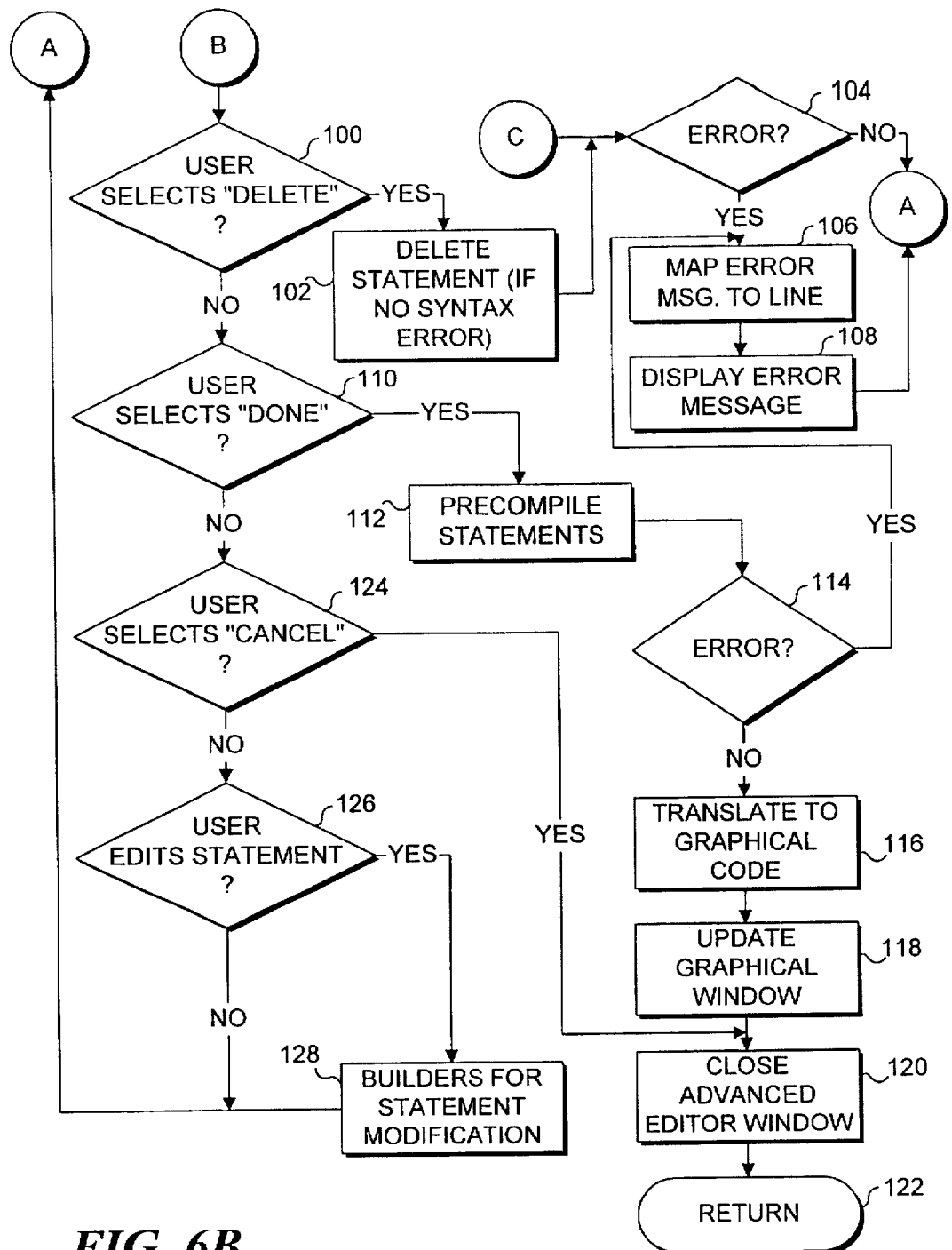

FIGS. 6A and 6B together show the steps involved in editing a program under the advanced view, as indicated by the title in block 62 of FIG. 6A. A block 80 indicates that a new toolbox is displayed, enabling the user to select from among a plurality of predefined text code constructs that are available to modify or create a game. In the preferred embodiment, the toolbox mentioned in block 80 is a code keyboard on which the available plain text code constructs are indicated by text appearing on each of the keys of the keyboard. (See FIG. 15.) Use of these plain text code constructs is described below in connection with a specific example.

A block 82 displays the code editor that allows the user to create, delete, or modify high-level plain text statements corresponding to steps of the graphic program. The graphical code is translated to the new plain text format in a block 84, and the plain text code in this new format is displayed to the user in a block 86. Examples of the translation of code from the graphic program to the high-level plain text format are also included in the discussion below.

A decision block 88 determines if the user has decided to "add a construct" to the plain text listing. (A "construct" is typically a plurality of related statements.) If so, a block 90 calls up a Wizard or Help sequence that assists the user in building the construct to be added to the code for the program. If the user has chosen not to carry out this step, a decision block 92 determines if the user has chosen to add a statement from the options presented in the code editor. If so, Wizard assistance is again provided in building a syntactically correct statement, as noted in a block 94. The logic then loops back to decision block 88.

A negative response to decision block 92 leads to a decision block 96. At this point, the program determines if the user has selected an option presented to validate the program. If so, a block 98 precompiles the statements contained within the code editor window. This step generates pseudo-code (P-code), which is an intermediate precompiled format of the plain text code statements that is not immediately executable. Thereafter, the logic proceeds in FIG. 6A at point C. If the user has not selected the Validate option in decision block 96, the logic proceeds to FIG. 6B at point B, continuing with a decision block 100. Decision lock 100 determines if the user has selected a "Delete" control and if so, a block 102 deletes the current statement that has been selected if doing so would not cause any syntax error. Thereafter, the block proceeds to the same point C reached from block 98 in FIG. 6A. From point C, a decision block 104 determines if any error exists in the current code following precompilation of the existing statements or deletion of a statement. If not, the logic returns to point A on FIG. 6A, thereby returning to decision block 88. However, if an error is found within the precompiled statements or following deletion of a statement, a block 106 maps the error message to the line causing the error in the plain text code, and a block 108 displays an error message that explains the nature of the error. After block 108, the logic proceeds from FIG. 6B to point A in FIG. 6A. Again, from point A in FIG. 6A, the program loops back to decision block 88.

Referring to FIG. 6B, in decision block 100, if the user has not selected the Delete option, a decision block 110 next determines if the user has indicated that editing of the program is "Done" and if so, proceeds to a block 112 in which all statements existing in the code window are precompiled. Thereafter, a decision block 114 determines if an error exists in the code that was precompiled to P-code, and if so, the program proceeds to block 106 to repeat the steps for mapping the error message to a particular line in the code and for displaying the error message.

If no error was found in decision block 114, the statements entered by the user are translated from P-code to graphical code in a block 116, and the graphical code listing is updated within a window of the code editor in a block 118. A block 120 then closes the advanced editing view window, and as indicated in a block 122, returns to the next step (of FIG. 5).

A negative response to decision block 110 leads to a decision block 124 to determine if the user has selected "Cancel." If so, the advanced view window is again closed, as provided in block 120, prior to returning to the logic in FIG. 5. However, if the user has not selected Cancel, a decision block 126 determines if the user has indicated a desire to edit a statement. This decision leads to a block 128, which provides a code builder Wizard for building or modifying a statement. Thereafter, or alternatively, if the response to decision block 126 is negative, the logic proceeds to point A in FIG. 6A, looping back to decision block 88.

Figure 7:
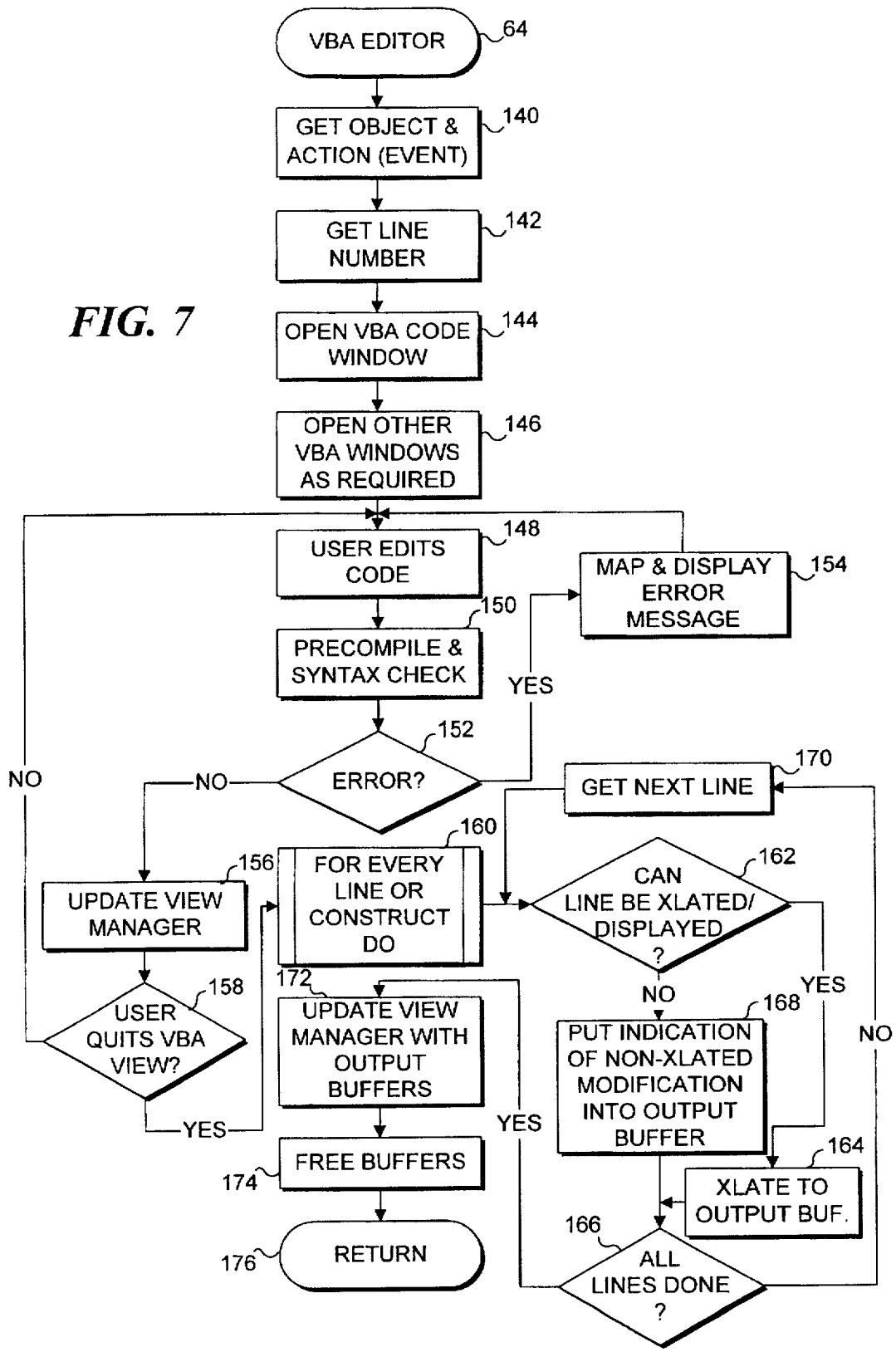
FIG. 7 is a flow chart illustrating the logical steps of a fourth mode of the graphical programming system.

In FIG. 7, details of the steps implemented when editing a program in VBA view are shown, as indicated by block 64. A block 140 provides for getting a user selected object and an associated action, which the user has previously indicated are to be modified. In a block 142, the program obtains a line number corresponding to the graphic object and its associated action, and in a block 144, opens the VBA code window in which the line obtained in block 142 will be displayed to the user for modification. Modification of VBA code may optionally involve use of related VBA tools (i.e., a VBA toolbar) and require that other windows be opened for displaying code; a block 146 thus provides for opening other VBA windows as required.

In a block 148, the user initiates editing of the displayed VBA code. An editing operation using VBA code may involve the addition of new code statements, the modification of the existing displayed code statement, or deletion of code statements. After the user completes an editing operation in the VBA code window, a block 150 precompiles the VBA code and completes a regular syntax check, as is conventionally done when editing VBA code. Next, a decision block 152 determines if an error has been detected in the precompilation and syntax check performed in block 150. If so, a block 154 maps the error detected to the particular line in which it occurred, and displays an error message to the user indicating the nature of the error found in the code statements. It should be pointed out that no attempt is made to check for logic errors or run-time errors at this point. Instead, the error checking is limited to the precompilation and syntax checks that are performed in block 150.

If an error is not detected in decision block 152, the logic proceeds to a block 156, which updates a View Manager (the View Manager displays the code in the selected view mode), confirming that the code modified or added by the user has passed the precompilation and syntax checking. A decision block 158 determines if the user has elected to quit the VBA view, having completed all intended editing in the VBA view mode. If not, the logic loops back to block 148, enabling the user to complete further editing of the code. Alternatively, the logic proceeds with a block 160, which initiates a Do loop that processes every statement in the game program by carrying out the steps indicated in blocks 162–168.

The first step of the Do loop is implemented in a decision block 162, which determines if the current line being processed can be translated and/or displayed as graphical code involving modification to an object. In view of the differences between the power and capacity to express programming concepts in VBA statements compared to that available in corresponding portions of a graphical program, it should be apparent that many lines and constructs expressed in VBA mode cannot be translated or displayed in the graphical programming mode or view. Accordingly, in such cases, a block 168 provides for putting into an output buffer an indication that the line or construct of the VBA code currently being processed is not fully translatable. However, if the VBA code statements can be translated and displayed as graphical programming code, a block 164 translates the VBA code to the output buffer in the graphical code form. A decision block 166 determines if all lines in the program have been processed and if not, loops to a block 170, which gets the next line in the VBA program. Thereafter, the loop repeats, starting with decision block 162.

After all lines have been completed, as determined in decision block 166, the logic continues with a block 172. In block 172, the program updates the View Manager with the output buffers loaded in blocks 164 and 168. The View Manager is then able to display the corresponding graphical program (where possible) based upon the editing carried out by the user in the VBA editing mode. In a block 176, the procedure returns to block 68 in FIG. 5.

The other text-based editing mode that is available to a user is obtained by selecting the option to view both the graphical program and corresponding VBA code. The advantage of this mode is that it provides the user with more graphic tools and assistance and provides a more friendly interface, since it includes both the graphic view and the VBA view editing capabilities, which are simultaneously displayed in windows on the screen. In this mode, the user is not restricted to a specific set of language constructs that are exposed on a tool or keyboard. Instead, the user is able to type into the VBA code editor whatever statements or constructs are allowed by VBA. In addition, this mode is not modal, since the user can switch back and forth between the graphical program and corresponding VBA editing windows. Synchronization between any changes made in the graphical program editor window or the VBA code editing window occurs immediately when the user enters, deletes, or changes a statement. Thus, modification of a VBA statement in the VBA code editor window produces a corresponding and immediate change (to the extent possible) in the graphical programming code editing window, and vice versa. A significant advantage of this mode is that it enables the user to immediately see how one representation of the program is reflected in the other (where possible).

Figure 8:
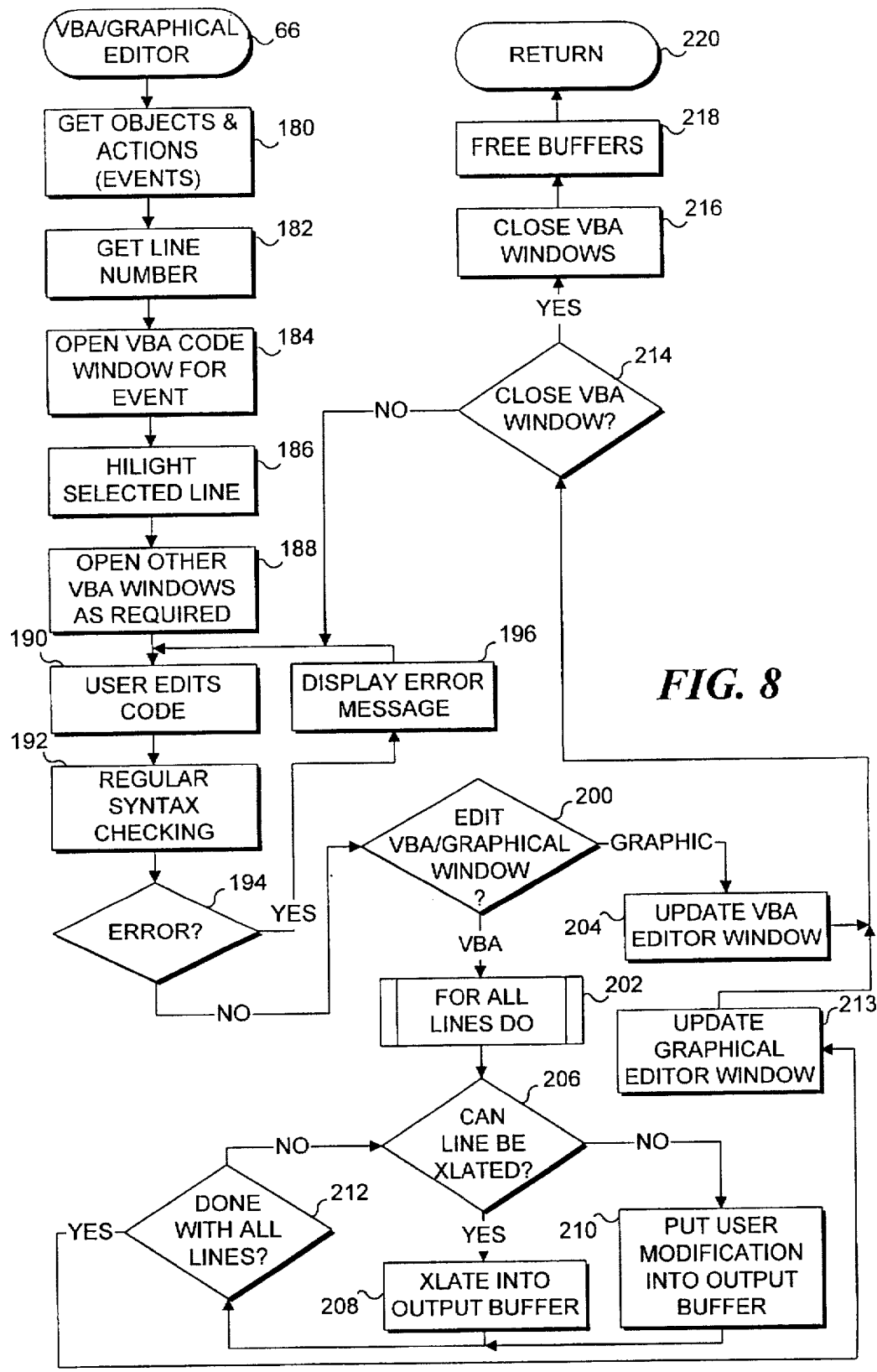
FIG. 8 is a flow chart showing the logic implemented in a fifth mode.
Figure 9:
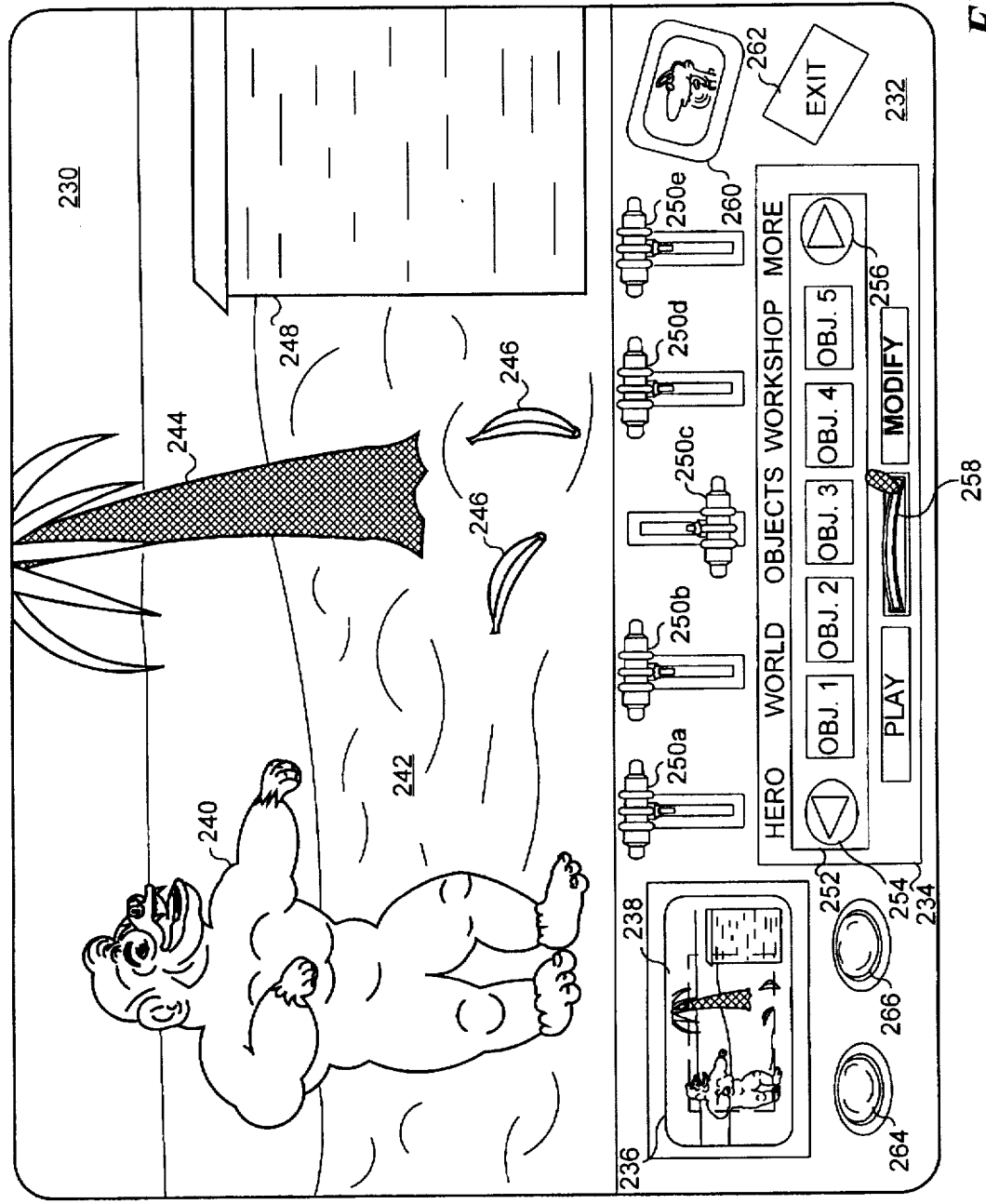
FIG. 9 is an exemplary (graphically simplified) view of a screen from a graphical program that is being modified using the graphical programming system, by selecting objects that will be included in the graphical program.

In FIG. 8, as indicated in block 66, the View Both editing modes option proceeds to a block 180, in which objects and actions selected by the user for editing are obtained. A block 182 provides for getting the corresponding line number (for the VBA code) and in a block 184, a VBA code window is opened for the event indicated by the line number. In addition, the selected line within the VBA code displayed in the VBA code editor window is highlighted in a block 186. Other VBA windows (and/or a VBA toolbar) are opened as required in a block 188.

In a block 190, the user begins to edit the code in either the VBA or graphical program editing windows. Changes made to the code, for example, adding, deleting, or modifying an existing graphic or VBA code statement, are precompiled and checked using the regular syntax checking procedures, as indicated in a block 192. Any error detected during this check is identified in a decision block 194. If an error is found, a block 196 provides for displaying the error message that explains the nature of the error. The logic then returns to block 190, so that the user can correct the indicated error. If an error is not detected in decision block 194, the logic proceeds to a decision block 200, which determines if the user has edited the graphical program in the graphical program editing window, or the VBA code program in the VBA code editing window. If the graphical program was edited, a block 204 provides for updating the corresponding VBA view provided in the VBA code editor window that is open on the screen so that it corresponds directly to the changes in the VBA code editor window. However, if the editing change was made in the VBA code editor window, a block 202 initiates a Do loop for all lines in the VBA program. In this loop, a decision block 206 determines if the current line in the VBA code editor window can be translated into a corresponding graphical program statement. If so, a block 208 translates the VBA code into the corresponding graphical code and places the translated graphical code into an output buffer. If it is not possible to translate the VBA code to an equivalent graphical code, a block 210 provides for putting the user modification to the VBA code into an output buffer with an indication that it cannot be translated. Following blocks 208 or 210, a decision block 212 determines if all lines in the VBA code window have been processed, and if not, returns in a loop back to decision block 206.

Once all lines are translated, the logic proceeds to a decision block 214. In addition, following the update of the VBA code editor window in block 204, the logic also proceeds to decision block 214. In this decision block, the program determines if the user has closed the VBA code edit window and if not, loops back to block 190, enabling the user to carry out further editing changes to the code. However, if the user has elected to close the VBA code edit window, a block 216 carries out that step. Thereafter, a block 218 frees the buffers that were used during the code translation process, and a block 220 returns to the logic in FIG. 5, at decision block 68.

An exemplary set of screen displays developed in connection with a prototype preferred embodiment of the present invention are shown in FIGS. 9 through 16. These figures show various exemplary aspects of the present invention as embodied in a game called "Kongo King." Kongo King represents a predefined graphical game program like those that might be included with the software comprising the present invention, for modification by a child or other user.

As the Kongo King game is run on personal computer 10, objects in the game appear in a running game area 230 of the display screen, above a control panel 232. At any time during the play of the game, the user can interrupt the execution of the game in order to modify it by activating a toggle switch 258, which appears on a sub-panel 234. When toggle switch 258 is flipped to a Modify position, execution of the game stops, but all objects remain visible on the screen at the point that the game is interrupted.

In the preferred embodiment, the visual world of the game may extend beyond the limits of the screen display, onto a virtual screen that becomes visible as the characters or objects in the game move toward the edges of the screen, causing the field viewed to shift. A view selection window 236 is included on control panel 232 and is provided with a user sizable selection window 238 (shown as dash lines in the Figure) to enable the user to move about in the virtual world of the game and to display a particular area of interest within the game at the point it is stopped for modification. In the exemplary view shown in FIG. 9, a Kongo King object 240 is illustrated on a backdrop comprising a beach scene 242. Also evident in this Example are other objects, including a palm tree 244, bananas 246, and a brick wall 248. Although the basic game as predefined when supplied to the user includes these objects, additional predefined objects can be added by the user. The graphical programming mode can be entered by moving the cursor over one of the objects in the game area of the screen (e.g., while the game is paused) and double clicking the select button on the mouse or other pointing device. To "graphically program the game," for example, to add a new object to the game, a user can move a cursor over one of the objects included on sub-panel 234 using mouse 22 (or other pointing device), and by selecting the object by holding down the select button, can drag and drop the object anywhere on the game area of the screen. (The object is dropped when the select button is released.) While not shown in this Example, each object is represented in its graphic box by an appropriate graphic icon. Thus, if the fourth object on sub-panel 234 comprises a banana, the user can add a third banana 246 using this drag and drop technique. Although only five objects are represented by graphic boxes in sub-panel 234, typically, the user can access additional objects by selecting a button 256 that displays other objects, and can change the specific objects exposed on the sub-panel, by selecting either control button 254 or control button 256. Object buttons are disposed on an object panel 252 that becomes visible when the user selects a toggle switch 250c.

Also included on control panel 232 is a toggle switch 250a, which is used to set the parameters for the Hero (Kongo King) and a toggle switch 250b, which is used to set parameters such as gravity, lighting, and other global properties (identified as World properties in the Figure). To the right of toggle switch 250c are toggle switches 250d and 250e. Toggle switch 250d selects a Workshop option in which the user is provided hints for modifying the game. The workshop screen is intended to teach the user additional aspects of programming in a way that the user will find entertaining. Toggle switch 250e is selected to display additional options (toggle switches), as shown below in connection with FIGS. 10 and 12.

Control panel 232 includes an Edit button 264, which is activated using the cursor controlled by mouse 22 to display a sub-menu (not shown) that includes options for Cut, Copy, and Paste, i.e., conventional editing functions. Similarly, a control button 266 can be activated to display a menu (not shown) that permits multiple Undo and Redo operations. If the user requires assistance in performing any operation in this graphical program mode, a helper icon 260 can be selected, causing a Help screen to open in which a cartoon-like character provides hints, Wizards, and other assistance to the user. At any time the user chooses to exit the application embodying the present invention, an Exit control 262 can be selected.

Figure 10:
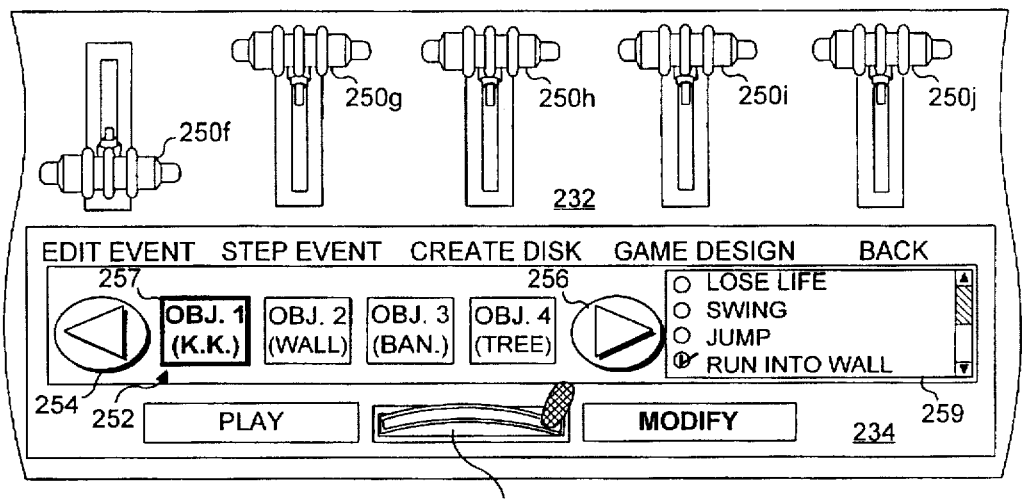
FIG. 10 illustrates a portion of the display screen view of the control panel in the graphical programming system, showing by example options that are available when an event is edited.

If the user activates toggle switch 250e, additional toggle switches 250f through 250j are disclosed on the display screen to provide other editing options, as shown in FIG. 10. These options, which are respectively associated with toggle switches 250f through 250j, include editing an event, stepping through the events in the graphic program one at a time, creating a disk or run-time version of the game program (to publish it so that other users can run the game program without the program used to create it), changing basic attributes of the game such as the backdrop using the Game Design feature, or switching back to access the options associated with toggle switches 250a through 250d.

With reference to the example shown in FIG. 10, a user has activated toggle switch 250f, selectively choosing to edit an event. Events are associated with specific objects and typically comprise at least one object and an associated action. In the example illustrated, the user has selected a graphic icon 257 (first object button) on object bar 252, which represents Kongo King. Once the user's selection is registered by the program, an event dialog option box 259 opens on the right side of object bar 252, providing the user with a list of different actions that can be selectively associated with Kongo King to define an event. In dialog box 259, only four such actions are shown, but additional available actions can also be viewed by scrolling through the dialog box in the conventional manner. Alternatively, the user can select any of the other objects used in the Kongo King program that are displayed on object bar 252; the user can selectively view additional objects by activating control buttons 256 and 254 to scroll left or right to display other object buttons.

Figure 11:
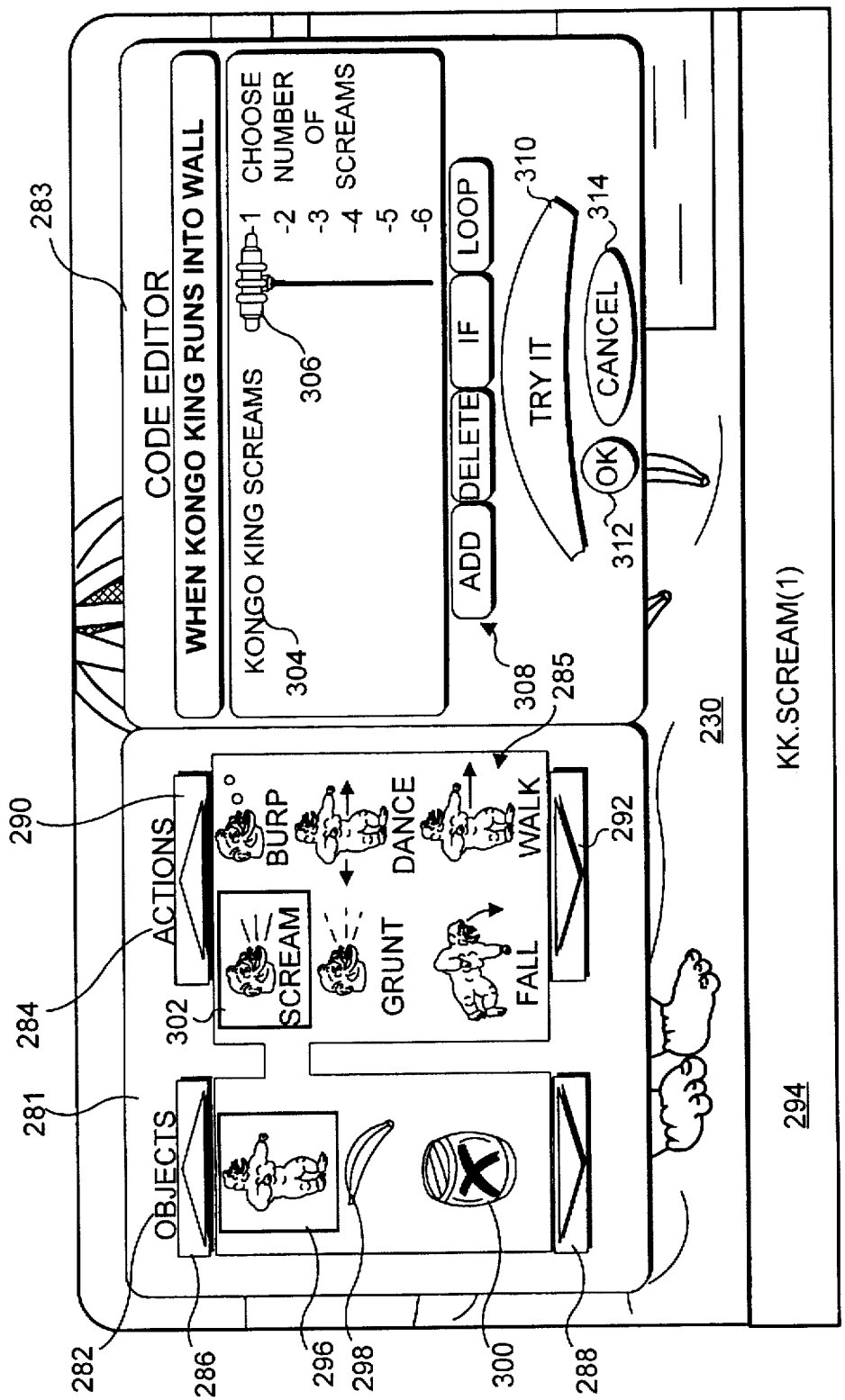
FIG. 11 shows a portion of the display screen on which an exemplary view of the controls available in the second mode to select graphic objects, actions, and parameters.

When the user selects a specific action that should be associated with a selected object, as for example, by indicating that the object "Kongo King" is to be associated with the action "runs into the wall," a graphical program code editor 283 opens on the right side of the screen, as shown in FIG. 11. To the left of the graphical program code editor is a graphic selection box 281, that includes objects 282 and actions 284 that can be selected to activate when the object/action (event) relationship occurs. In this Example, the user has selected a graphic icon 296 representing Kongo King from graphic selection box 281, and has chosen a graphic icon 302, representing an action that the user wants to happen when the event "Kongo King runs into the wall" occurs. In this Example, graphic icon 302 indicates that Kongo King is to scream. Additional available actions are also provided, as indicated by the other displayed graphic icons 285. Furthermore, the user can scroll the window up or down to display still other available actions by selecting an up arrow 290 or a down arrow 292. Similarly, objects represented by a banana icon 298 or a barrel icon 300 can be selected, and the user can display other objects to associate with an action by selecting an up arrow 286 or a down arrow 288 to scroll through the available objects.

When, as shown in the Example, the user selects an action for the selected object, the code editor displays a corresponding plain text listing 304 of the event/action and provides the user an option to set any parameters associated therewith. Some actions do not have parameters associated with them. In the Example, a slider switch 306 can be moved to choose the number of screams Kongo King will emit upon running into a wall.

Graphical program code editor 283 also includes other controls 308 for adding and deleting graphical program steps, introducing "if" clauses, and looping or repeating statements and constructs represented by the plain text listing. In addition, a control 310 labeled "Try It" is presented so that the user can immediately try the code graphically selected to see the effect of any modification or addition made to the graphical program. Buttons 312 and 314 respectively enable the user to select OK or CANCEL, indicating that the corresponding action should be taken.

Below the game area appears a one-line window 294 in which the VBA code corresponding to the graphical program step entered by the user in the graphical program code editor is displayed. In this Example, the one-line window includes the statement KK.SCREAM(1), which is the corresponding VBA code statement for the action just selected by the user in the above graphical program code editor. In the graphical code editing view mode that is shown in FIG. 11, the user cannot directly change the VBA statement appearing in one-line window 294 to modify the program; the VBA code shown is effectively read only. However, two user selectable options are available, depending upon the experience level of the user. In the first option, clicking on any portion of the VBA statement that appears in one-line window 294 has no effect at all. The second option permits the user to click on either the object or the action portion of the VBA statement to change the focus of the graphic code editor. For example, if the user clicks on the "KK" portion of the VBA statement, the focus shifts to graphic icon 296, which represents Kongo King. Similarly, if the user clicks on the action portion of the VBA statement "SCREAM," the focus in the graphic code editor shifts to the corresponding graphic icon 302 under the action that can be associated with the selected object. A click on the parameter portion of the VBA statement "(1)," causes the focus to shift to toggle switch 306.

Figure 12:
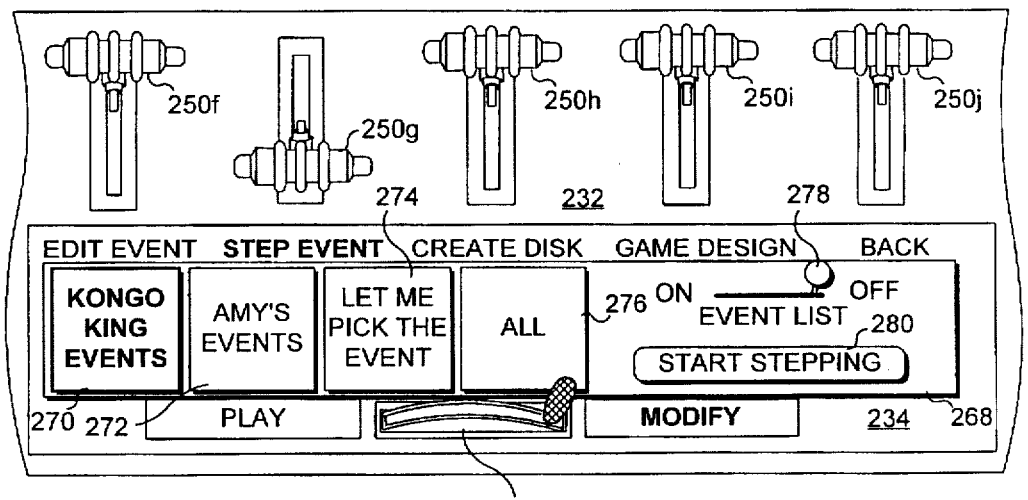
FIG. 12 illustrates a portion of the display screen view of the control panel, showing an example of the options provided when stepping through events.

By activating toggle switch 250g in FIG. 10, the user can selectively choose to step through the events comprising the graphical program. Selecting the Step Event option opens an event panel 268 on sub-panel 234 as shown in FIG. 12, providing the user with buttons for selectively filtering the events through which the graphical program steps. In the Example illustrated, the user has selected a button 270, indicating the desire to step through Kongo King events. As a result, only the events associated with Kongo King will be used in the Step Event function; all other events will be filtered out. A second control button 272 is labeled "Amy's Events." In this Example, the user's name is Amy (entered when the user first begins running the graphical programming system software application), and selecting control button 272 will cause only those events added by Amy or modified by Amy during the current session to be included in the Step Event function. A third control button 274 enables the user to pick the particular event or series of events through which the Step Event function will operate. Finally, a control button 276 includes all events when the Step Event function is implemented. A toggle switch 278 gives the user the option to selectively list the events that occur after the user toggles a start stepping switch 280.

The ability to filter events so that only those implemented by a specific object or those effected by changes made by the user greatly simplifies the editing of code typically carried out during the Step Event function. By stepping only through the filtered events, other events which are of no concern are not presented to the user and the task of editing or finding problems in the program is greatly simplified.

Figure 13:
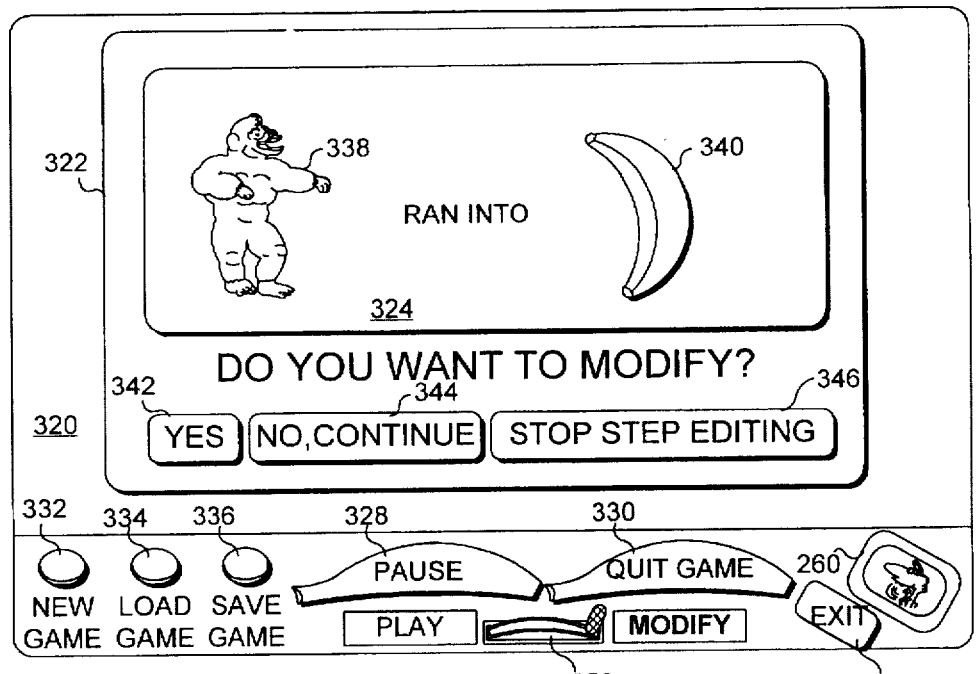
FIG. 13 illustrates one exemplary screen (first step) of those that may be displayed when the step editor is used for graphically editing the program.

FIG. 13 shows a graphical program step editor window 322 that is displayed on the screen during the Step Editing mode. In a window 324, a current or past object and action (together comprising an event) are graphically displayed. For the illustrated Example, a graphic object 338 representing Kongo King is shown in connection with both an action "RAN INTO" and another graphic object 340, which represents a banana. The graphical program step editing window presents the user with the option of modifying the currently displayed event. Three buttons 342, 344, and 346 give the user the option of selecting YES, indicating a desire to modify the currently displayed event, or NO, indicating that the user wants to continue with the next step, or STOP STEP EDITING, which is selected to discontinue the step editing operation. Several other control options are presented on control buttons 332, 334, and 336, including the option of starting a new game, loading another game, or saving the game as currently modified. Also included are controls 328 and 330 for respectively pausing or quitting the current game.

Figure 14:
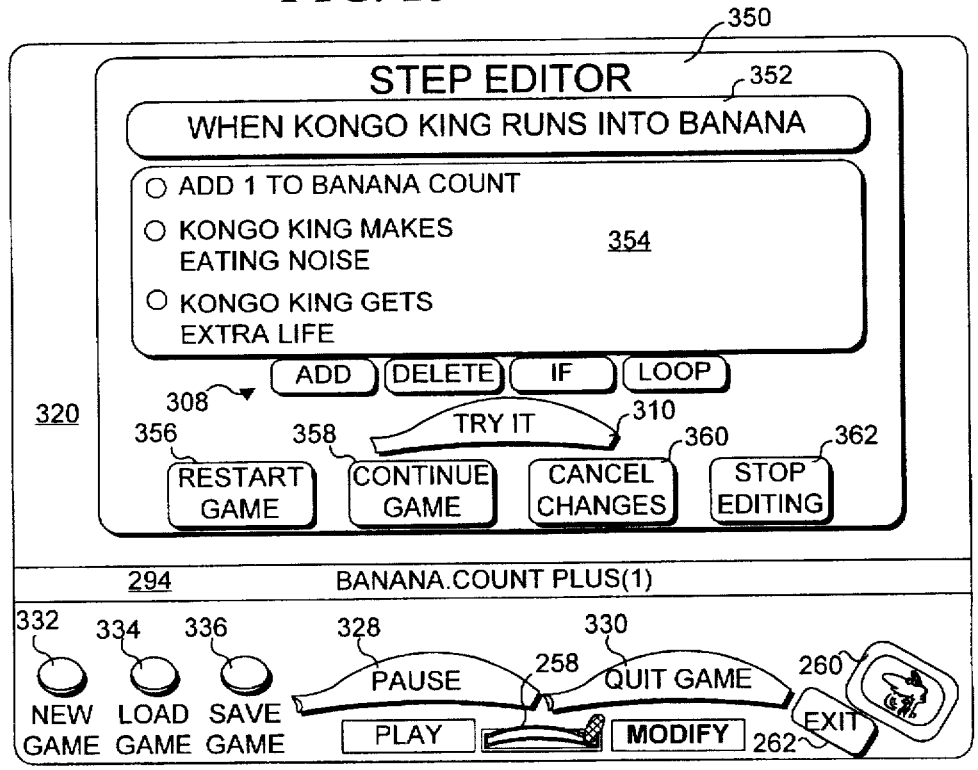
FIG. 14 illustrates another exemplary screen displayed when the step editor is used for editing the graphical program.

In the event that the user elects to modify the graphically displayed event, as indicated by the user selecting YES (control button 342 in FIG. 13), a step editor window 350 opens up on the screen, referencing the event to be edited in a block 352. FIG. 14 illustrates the graphic step editor that opens at this point. In this Example, the event is indicated in plain text as "WHEN KONGO KING RUNS INTO BANANA." A window 354 indicates the actions that will be taken when editing the event selected, and these actions are presented in plain text. For the example shown in FIG. 14, the user has elected an action—ADD 1 TO BANANA COUNT—that will occur when Kongo King runs into a banana. One-line window 294 includes the corresponding VBA statement "BANANA.COUNT PLUS(1)."

Below window 354 in the Step Editor are included controls 308, control 310, and additional controls 356 through 362. Control 356 provides for restarting the game program at the beginning, control 358 makes the editing changes selected by the user and restarts the game program running at the point it was interrupted. Control 360 cancels the changes made by the user during the step editing process, and control 362 stops the step editing process.

Figure 15:
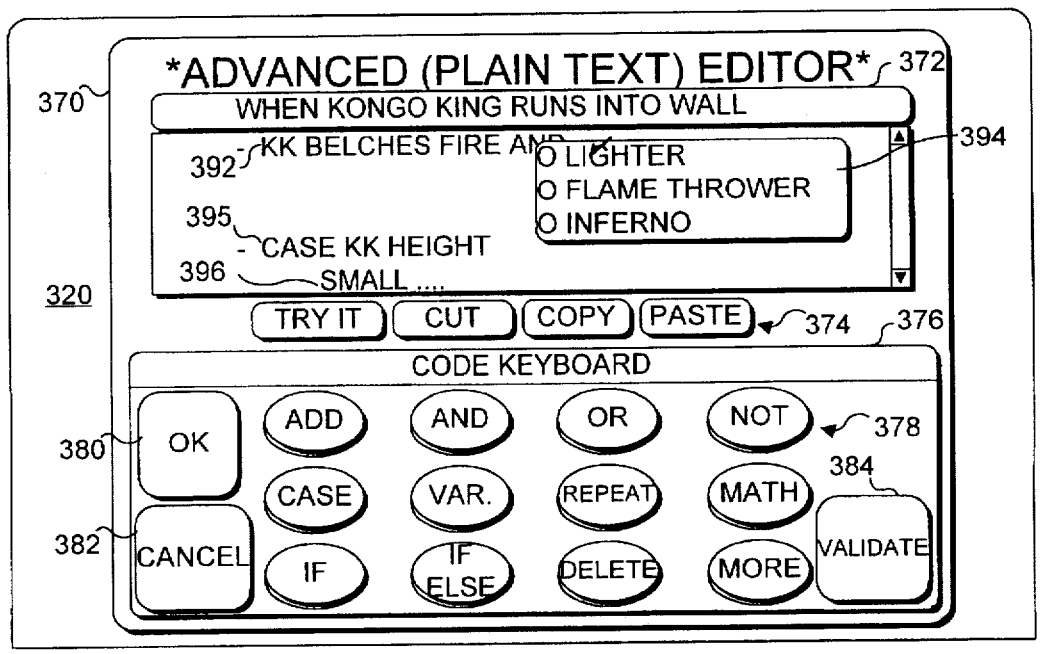
FIG. 15 illustrates a display screen view of a keypad on which are included programming constructs for entering plain language programming language commands in the third mode.

The Advanced editing mode is illustrated in FIG. 15. In this view, a code editor 370 is open on the display screen. Code editor 370 includes a window 372 in which an event is listed for one of the selected objects. In the example shown, the event listed is "WHEN KONGO KING RUNS INTO WALL." Below the plain text listing of the event being edited are a series of plain text statements indicating actions that are currently in the program. A line 392 indicates that when Kongo King runs into the wall, Kongo King belches fire, and a parameter box 394 indicates the size of the flame emitted. A line 395 is an Example of a construct, reading "CASE KK HEIGHT." The first line 396 under the Case construct reads "SMALL;" additional lines of the plain text listing view of the game program can be observed by scrolling within the window.

A code keyboard 376 appears within the Advanced code editor window and includes a plurality of keys 378 that can be selected to assist the user in adding code in the plain text format to the code editor window. For example, if the user selects the key labeled "MATH," a Wizard dialog (not shown) opens on the screen to assist the user in adding mathematical statements to the program. By providing the code keyboard and assistance related to each of the constructs and functions represented by the keyboard buttons that can be selected, an inexperienced user can easily add plain text program statements like those shown in the example, without concern about errors in syntax. The graphical programming system ensures that syntax errors are not entered in the Advanced programming view or editing mode.

The control keyboard includes conventional OK and CANCEL controls 380 and 382 for indicating that the user is finished with plain text editing in the advanced view mode, or for canceling any changes that have been made. A VALIDATE control 384 can be selected to determine whether the code is syntactically correct and will not give rise to any precompilation errors. However, use of VALIDATE control 384 does not detect run-time errors or errors in logic introduced by the user when editing a game program.

After the user has become sufficiently experienced in programming using the graphical program editor and the Advanced view code editor, it is likely that the user may wish to make further changes that can only be made by activating the VBA code editing mode. The option to edit the game program in ways that are beyond the scope of the graphical programming mode and the Advanced programming mode is therefore an incentive that will encourage users to learn more about text based programming in the VBA code editing mode.

Figure 16:
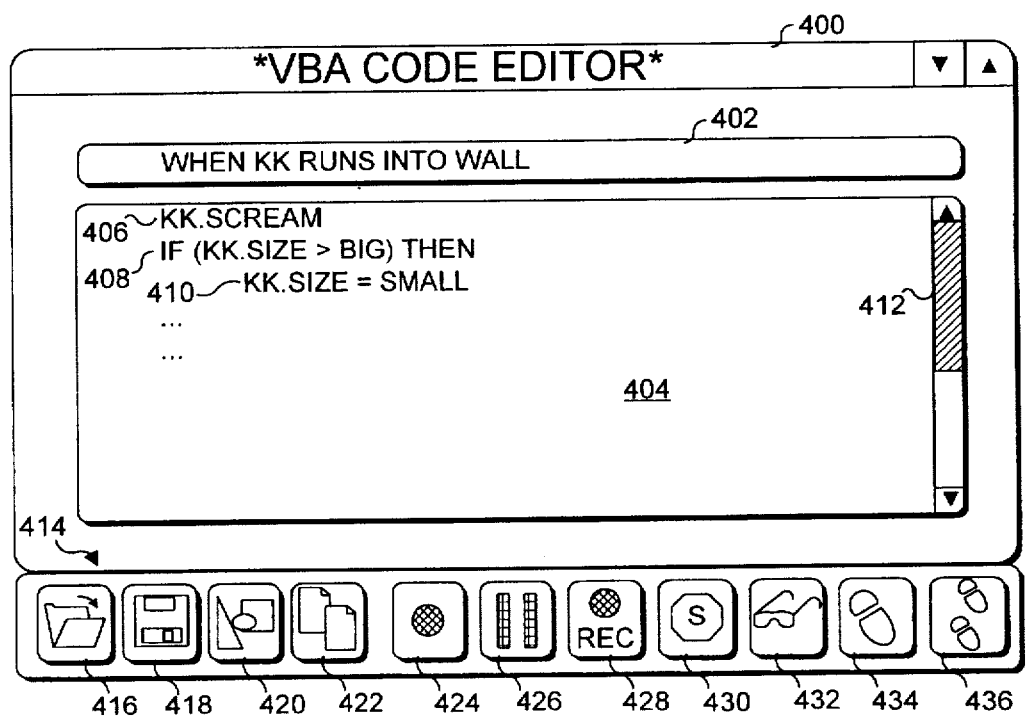
FIG. 16 illustrates a code editor for adding to and/or editing text-based program steps, in a fourth mode.

In FIG. 16, an exemplary VBA code editor 400 is illustrated. VBA code editor 400 shows the VBA code that is to be executed when an event shown in a window 402 occurs. In the Example, the event listed in window 402 states "WHEN KK RUNS INTO WALL," and the VBA statements that depend upon this event are shown in a VBA code editor window 404. Only three lines of VBA code are illustrated in this example. A line 406 indicates that one action "KK.SCREAM" will occur. The next VBA statement in window 404 is a line 408, which is an "IF" clause, reading "IF (KK.SIZE>BIG), THEN" followed by a line 410 reading "KK. SIZE=SMALL." A scroll bar 412 is included for scrolling through statements in the VBA code window. Below the VBA code editor is a VBA toolbar 414. VBA toolbar 414 includes a plurality of controls 416 through 436 that can be used to implement different functions within the VBA code editor window. Control 416 opens a directory, enabling the user to select a file. Control 418 saves the current file. A different file can be selected using control button 416. Control button 420 activates a list of available objects that can be included in the VBA statements, and a control 422 opens a property sheet for any statement that has been selected. The remaining controls 424 through 436 are used in controlling the game program being developed by the user. Control 424 is a play button, that initiates play of the game program. Control 426 causes the program developed by the user to pause.

Since certain control actions made by the user can be recorded, a control 428 enables the user to initiate recording the selection of keys on the keyboard and selections made using mouse 22. Control 430, which includes an octagonal-shaped stop sign graphic symbol, is used for stopping execution of the program. A control 432 can be activated to set a watch point and is useful for monitoring variables or actions in the code. A single "footstep" graphic symbol on control 434 indicates that it is used for stepping through a program, while the multiple "steps" of the graphic symbol on control 436 indicate its use in stepping over statements in the program that have been selected.

Although VBA code editor 400 gives the user substantially more latitude in developing and modifying games, it should be evident that only more sophisticated users will be able to understand the VBA programming language that is required for use of this editing mode. To achieve this level of understanding, the mode that combines display of the VBA code editor view window with the graphic programming view window is preferable for teaching the user the relationship between the graphic programming steps in a program and corresponding VBA code. Although not specifically shown, this combined mode enables both the VBA code editor window shown in FIG. 16, and the corresponding graphical program code editor window shown in FIG. 11 to be simultaneously displayed on the screen to provide an immediate feedback of the correspondence between graphical program steps and the corresponding VBA code that supports those steps.

Although it is not possible to provide a one-to-one correspondence for every editing change made in the VBA code editor screen to that shown in the corresponding graphical program editor screen, where the mapping is possible on a one-to-one basis, the user will be provided with an entertaining and easily assimilated education, which should eventually lead to substantially improved skill in writing VBA code programs. The skills developed in this manner should thus be applicable to developing more sophisticated programs, including those that are created from scratch, without the benefit of starting with a basic predefined graphical game program.

Although the present invention has been described in connection with the preferred form of practicing it, it will be understood by those of ordinary skill in the art that many modifications can be made thereto within the scope of the claims that follow. Accordingly, it is not intended that the scope of the invention in any way be limited by the above description, but that it be determined entirely by reference to the claims that follow.

The invention in which an exclusive right is claimed is defined by the following:

1. A graphical programming system adapted to execute under a graphic user interface, said graphical programming system being adapted to enable a user to design and modify a graphical program, and to assist the user in learning computer programming with a text-based programming language, comprising:
   (a) a computer on which the graphical programming system executes under the graphic user interface, said computer including a user input device for making selections and entering instructions that control the graphical programming system, and a display screen on which are displayed components of the graphical programming system;
   (b) object means for presenting a plurality of graphic objects on the display screen of the computer and for enabling the user to select a specific graphic object from among said plurality of graphic objects, for inclusion in the graphical program;
   (c) action means for displaying a plurality of actions to the user on the display screen, at least one of said plurality of actions being represented by a graphic icon, and for enabling the user to select a specific action for execution by a user selected graphic object, thereby creating and displaying a user defined sequence of graphic program steps that include text and graphic objects, said user defined sequence of graphic program steps comprising the graphical program; and
   (d) mode selection means for enabling the user to select a mode from among a plurality of different modes, one of said plurality of different modes displaying at least a portion of a textual computer program listing corresponding to a portion of the graphical program, a plain text mode enabling the user to enter text that is translated to program commands in the textual computer program listing for modifying the graphical program, said textual computer program listing assisting the user to learn computer programming by exposing the user to the program commands of the text-based programming language that correspond to the graphic program steps of the graphical program.

2. The system of claim 1, wherein the plain text entered by the user is constrained to text that correctly translates to the commands in the text-based programming language.

3. The system of claim 2, wherein the plain text that can be entered by the user is limited to a predefined set of programming language constructs that are presented to the user in a graphical keyboard displayed on the display screen, for selection and use in designing and modifying the graphical program.

4. The system of claim 1, wherein another mode of the plurality of modes enables the user to freely enter and modify commands of the text-based programming language to design and modify the graphical program.

5. The system of claim 1, wherein another mode of the plurality of modes enables the user to simultaneously view both an editor for the graphical program and an editor for the text-based programming language so that changes in the graphical program are immediately reflected in the corresponding commands of the text-based programming language and so that changes in the commands of the text-based programming language are immediately reflected in the corresponding graphical program.

6. The system of claim 1, wherein the graphical programming system includes a basic graphical program for the user to modify.

7. The system of claim 1, further comprising means for mapping between graphical steps of the graphical program and the corresponding commands of the text-based programming language.

8. The system of claim 8, wherein the graphical program is executed by the computer based upon underlying corresponding commands of the text-based programming language.

9. The system of claim 1, further comprising animated help means that prompt the user to carry out steps required in designing and modifying the graphical program.

10. The system of claim 9, wherein the help means provide help to the user in debugging the graphical program.

11. The system of claim 1, further comprising event means enabling the user to select an event from among a plurality of events graphically presented to the user on the display screen, for association with one of the graphic objects selected by the user.

12. The system of claim 11, wherein the action means enable the user to specify the action associated with one of the graphic objects selected by the user that will be implemented when the event selected occurs.

13. A method for creating a graphical program for use on a computer under a graphic user interface operating system, to enable a user to graphically design and modify the graphical program, and by doing so, to better understand a text-based programming language, said method comprising the steps of:
   (a) presenting a plurality of graphic objects on a display screen of the computer and enabling the user to select specific graphic objects from among those presented for inclusion in the graphical program;
   (b) displaying a plurality of actions for the graphic objects, at least one of said plurality of actions being represented by a graphic icon, and enabling the user to select a specific action to apply to any of the graphic objects that were selected to create a user defined sequence of graphic program steps comprising the graphical program;

(c) enabling the user to selectively display a plain text listing corresponding to at least a portion of the graphical program, said plain text listing enabling the user to better understand the text-based programming language by comparison of commands of the text-based programming language, which are included within the plain text listing, to the corresponding portion of the graphical program; and (d) enabling the user to modify the plain text listing, causing corresponding changes to the graphical program.

14. The method of claim 13, wherein the step of enabling the user to selectively display further comprises the step of enabling the user to select one of a plurality of modes for displaying and modifying program commands that affect the graphical program.

15. The method of claim 13, further comprising the step of enabling the user to graphically select an event for association with one of the graphical objects from among a plurality of events.

16. The method of claim 13, further comprising the step of enabling the user to associate an action implemented by one of the selected graphical objects with an event associated with said one of the selected graphical objects so that the action is carried out when the event happens to said one of the graphical objects.

17. The method of claim 13, wherein the step of selectively displaying further comprises the step of enabling the user to select a mode for designing and modifying the graphical program by making changes to an underlying text-based programming language.

18. The method of claim 17, wherein the changes that the user is enabled to make to the underlying text-based programming language are constrained to a predefined set of programming language constructs.

19. The method of claim 17, wherein an editor for the graphical program and an editor for the underlying text-based programming language are both displayed, so that changes made in the underlying text-based programming language are reflected in the editor for the graphical program, and so that changes made in the graphical program are reflected in the editor for the underlying text-based program language, thereby enabling the user to observe a relationship between the graphical program and the underlying text-based programming language.

20. The method of claim 17, further comprising the step of translating between the graphical program and the underlying text-based programming language.

21. The method of claim 13, further comprising the step of providing an animation for prompting the user to carry out steps required to design and modify the graphical program.

22. The method of claim 21, wherein the animation provides help to the user in debugging the graphical program.

23. The method of claim 13, further comprising the step of enabling the user to modify a graphical program supplied to the user.

24. The method of claim 13, further comprising the step of providing a set of graphical tools for designing and modifying the graphical program.

25. The method of claim 13, wherein one line of the graphical program may correspond to a plurality of lines of the plain text listing.

26. The method of claim 13, wherein a modification to the graphical program made during an interruption of its execution is implemented when the graphical programmed is again resumed.

27. The method of claim 13, further comprising the step of enabling the user to set properties for at least some of the graphical objects selected by the user.

* * * * *